United States Patent
Kahn et al.

(10) Patent No.: US 8,478,797 B2
(45) Date of Patent: *Jul. 2, 2013

(54) ATOMIC DELETION OF DATABASE DATA CATEGORIES

(75) Inventors: Clifford E. Kahn, Westford, MA (US); Roger A. Chickering, Granite Bay, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/485,482

(22) Filed: May 31, 2012

(65) Prior Publication Data

US 2012/0239685 A1  Sep. 20, 2012

Related U.S. Application Data

(63) Continuation of application No. 12/637,930, filed on Dec. 15, 2009, now Pat. No. 8,214,411.

(51) Int. Cl.
  *G06F 17/30* (2006.01)
(52) U.S. Cl.
  USPC ........... 707/813; 707/642; 707/687; 707/708; 711/1
(58) Field of Classification Search
  USPC ........... 707/642, 687, 708, 813–820; 711/1–6
  See application file for complete search history.

(56) References Cited

U.S. PATENT DOCUMENTS

| | | | | |
|---|---|---|---|---|
| 7,739,290 B2 * | 6/2010 | Rossmann | | 707/755 |
| 7,769,792 B1 * | 8/2010 | Burrows et al. | | 707/814 |
| 7,877,371 B1 * | 1/2011 | Lerner et al. | | 707/708 |
| 8,140,599 B1 * | 3/2012 | Patterson | | 707/813 |
| 2002/0016185 A1 * | 2/2002 | Yuzawa | | 455/556 |
| 2002/0029220 A1 * | 3/2002 | Oyanagi et al. | | 707/101 |
| 2003/0131252 A1 * | 7/2003 | Barton | | 713/193 |
| 2003/0172091 A1 * | 9/2003 | Norcott | | 707/203 |
| 2003/0191783 A1 * | 10/2003 | Wolczko et al. | | 707/206 |
| 2006/0242464 A1 * | 10/2006 | Holt | | 714/25 |
| 2008/0195678 A1 * | 8/2008 | Chen et al. | | 707/205 |
| 2011/0145206 A1 | 6/2011 | Kahn et al. | | |
| 2011/0145209 A1 | 6/2011 | Kahn et al. | | |

OTHER PUBLICATIONS

TCG Trusted Network Connect, "TNC IF-MAP binding for SOAP," Version 1.0, Revision 25, Apr. 28, 2008, 99 pages.

* cited by examiner

*Primary Examiner* — Dennis Truong
(74) *Attorney, Agent, or Firm* — Harrity & Harrity, LLP

(57) ABSTRACT

A device maintains, in a database, a plurality of data items, each data item of the plurality of data items being associated with a respective category. The device associates, in the database, a first counter value with each data item, the first counter value indicating a number of times the respective category has been deleted from the database at a time when the data item was stored in the database. The device associates, in the database or another database, a second counter value with the respective category, the second counter value indicating a current value for a number of times the respective category has been deleted from the database. The device selectively deletes, from the database, one or more data items of the plurality of data items from the database based on the first counter values and the second counter value.

20 Claims, 9 Drawing Sheets

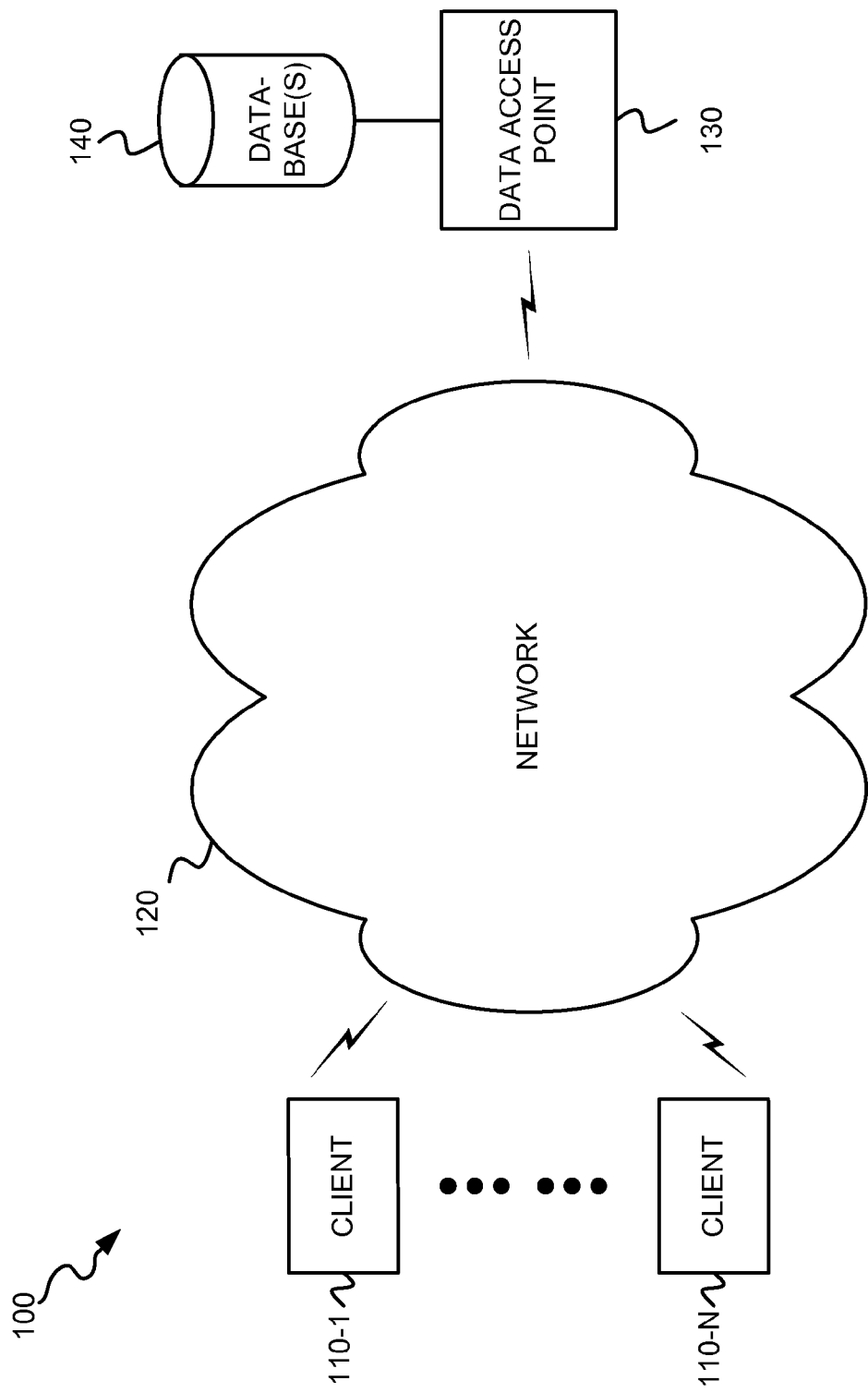

ATOMIC DELETION OF DATABASE DATA CATEGORIES

RELATED APPLICATION

This application is a continuation of U.S. patent application Ser. No. 12/637,930, filed Dec. 15, 2009, which is incorporated herein by reference.

BACKGROUND

Database management systems (DBMSs) organize the storage of data. DBMSs control the creation, maintenance and use of data structures stored in their databases. Database data structures are typically stored in memory or on hard disk in one of many forms, including ordered or unordered flat files, heaps, hash buckets, B+ trees or Indexed Sequential Access Method (ISAM) structures. Databases typically conduct database transactions by enforcing one or more of four rules: atomicity, consistency, isolation and durability. The atomicity rule requires that all tasks in a transaction must be performed, or that none of the tasks in the transaction should be performed. The consistency rule requires that every transaction preserves the integrity constraints of the database. The isolation rule requires that two simultaneous transactions not interfere with one another (i.e., intermediate results within a transaction are not visible to other transactions). The durability rule requires that completed transactions not be aborted or their results discarded.

Interface for Metadata Access Points (IF-MAP) is a protocol that provides a standardized framework for network and security devices to publish device data, such as, for example, Internet Protocol (IP) address or authentication data, to a central repository that can be used by other applications. The central repository can be used for security, asset management, discovery, or other purposes. The central repository, thus, acts as a DBMS that manages data related to network and security devices. Data published to the IF-MAP repository may be labeled with an identifier of the publisher that published the data to the repository. The IF-MAP protocol then permits a publisher to subsequently purge (i.e., delete) previously published material using, for example, a purgePublisher request. Data from the repository labeled with the publisher's identifier must be deleted in response to the issuance of a IF-MAP purgePublisher request. A publisher may desire to purge published data due to, for example, a system failure, a system re-start or a network disconnection event associated with the publisher.

SUMMARY

In accordance with one embodiment, a method may include maintaining, in a database, a plurality of data items, each data item of the plurality of data items being associated with a respective category. The method may further include associating, in the database, a first counter value with each data item, the first counter value indicating a number of times the respective category has been deleted from the database at a time when the data item was stored in the database. The method may also include associating, in the database, a second counter value with the respective category, the second counter value indicating a current value for a number of times the respective category has been deleted from the database. The method may additionally include selectively deleting, from the database, one or more data items of the plurality of data items from the database based on the first counter values and the second counter value.

In another implementation, a device may include a memory to store instructions; and a processor to execute the instructions to: maintain, in a database, a plurality of data items, each data item of the plurality of data item being associated with a respective category, associate, in the database, a first counter value with each data item, the first counter value indicating a number of times the respective category has been deleted from the database at a time when the data item was stored in the database, associate, in the database, a second counter value with the respective category, the second counter value indicating a current value for a number of times the respective category has been deleted from the database, receive a request to delete the category, increment the second counter value, in response to receiving the deletion request, to generate an incremented second counter value, and selectively delete, from the database, one or more data items of the plurality of data items based on the first counter values and the incremented second counter value.

In still another implementation, a computer-readable medium containing instructions executable by at least one processor may include one or more instructions to maintain, in a database, a plurality of data items, each data item of the plurality of data item being associated with a respective category. The computer-readable medium may further include one or more instructions to associate, in the database, a first counter value with each data item, the first counter value indicating a number of times the respective category has been deleted from the database at a time when the data item was stored in the database. The computer-readable medium may also include one or more instructions to associate, in the database, a second counter value with the respective category, the second counter value indicating a current value for a number of times the respective category has been deleted from the database. The computer-readable medium may additionally include one or more instructions to selectively delete, from the database, one or more data items of the plurality of data items from the database based on the first counter values and the second counter value.

In yet another implementation, a device may include means for maintaining, in a database, a plurality of data items, each data item of the plurality of data item being associated with a respective category. The device may further include means for associating, in the database, a first counter value with each data item, the first counter value indicating a number of times the respective category has been deleted from the database at a time when the data item was stored in the database, and means for associating, in the database, a second counter value with the respective category, the second counter value indicating a current value for a number of times the respective category has been deleted from the database. The device may also include means for receiving a request to delete the category, where the deletion request comprises an Interface for Metadata Access Points (IF-MAP) purgePublisher request, and means for incrementing the second counter value, in response to receiving the deletion request, to generate an incremented second counter value. The device may additionally include means for selectively deleting, from the database, one or more data items of the plurality of data items from the database based on the first counter values and the incremented second counter value.

BRIEF DESCRIPTION OF THE DRAWINGS

The accompanying drawings, which are incorporated in and constitute a part of this specification, illustrate one or more embodiments described herein and, together with the description, explain the invention. In the drawings, FIG. 1A is a diagram of an exemplary network in which systems and methods described herein may be implemented;

DETAILED DESCRIPTION

Figure 1B:
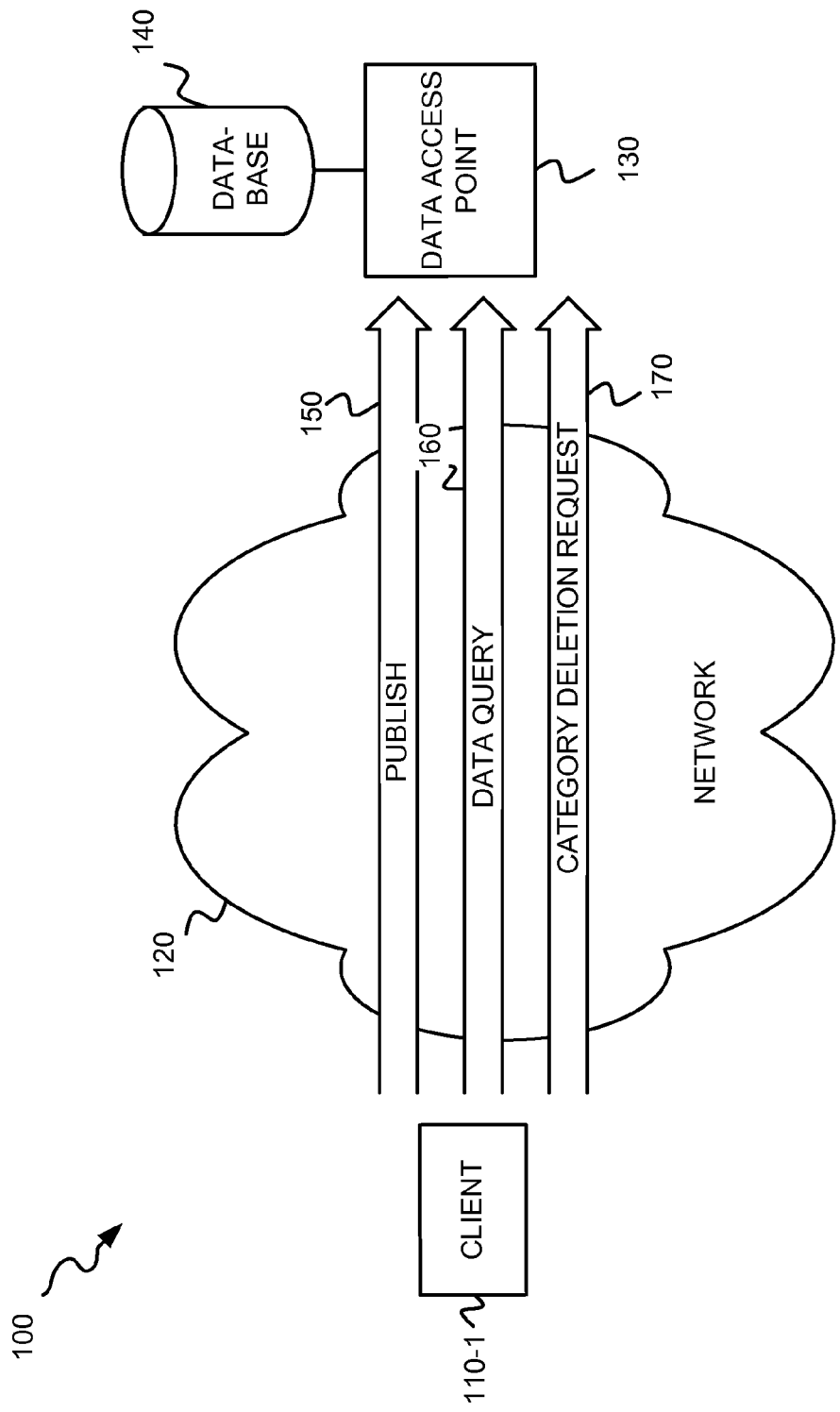
FIG. 1B is a diagram of exemplary interactions between a client and the data access point of FIG. 1A.

The following detailed description refers to the accompanying drawings. The same reference numbers may be used in different drawings to identify the same or similar elements. Also, the following detailed description does not limit the invention. Instead, the scope of the invention is defined by the appended claims and equivalents.

Exemplary embodiments described herein implement mechanisms for atomically deleting categories of data from a database. As described herein, a counter value, which maintains a current count representing the quantity of times a given category has been deleted, is used when deciding whether to delete items of data that are associated with the category. A category, as referred to herein, includes a label that identifies a set of related data items. When a new item of data is received for storing in the database, where the item of data is associated with a category, a current count, representing the quantity of times that a particular category has been deleted, is incremented and the new value is stored in the database. Individual data items may then be selected for deletion from the database by comparing the new value of the count, that represents the quantity of times that the category has been deleted, with the previously stored count associated with each item of data. Subsequently, when a deletion request is received for the category, a current count, representing the quantity of times that the category has been deleted, is obtained at that particular instant in time, and compared to the previously stored count associated with the item of data. If the current count is greater than the previously stored count, then the item of data may be deleted from memory during a garbage collection process. This garbage collection process may be repeated for each data item stored in the memory that is associated with the same category.

Exemplary Network

FIG. 1A depicts an exemplary network 100 in which systems and methods described herein may be implemented. Network 100 may include multiple clients 110-1 through 110-N, a network 120, a data access point 130, and a database 140. Clients 110-1 through 110-N, and data access point 130, may connect to network 120 via wired or wireless links Each of clients 110-1 through 110-N (collectively referred to herein as "clients 110," or generically referred to herein as "client 110") may include a server (e.g., a rack mounted server), a computer (e.g., laptop, desktop or palmtop), a cellular radiotelephone, a personal digital assistant (PDA), or a Personal Communications Systems (PCS) terminal. In some embodiments, one or more of clients 110 may include a server entity that may interact with data access point 130 via network 120.

Network 120 may include one or more networks of any type, including a local area network (LAN); a wide area network (WAN); a metropolitan area network (MAN); a telephone network such as a Public Switched Telephone Network (PSTN) or a Public Land Mobile Network (PLMN); a satellite network; an intranet; the Internet; or a combination of networks. The PLMN may further include a packet-switched network, such as, for example, a General Packet Radio Service (GPRS) network, a Cellular Digital Packet Data (CDPD) network, or a Mobile IP network.

Data access point 130 may include a server entity or device that may receive update requests from clients 110-1 through 110-N for storing data items in database 140. Upon receipt of such update requests, data access point 130 may store the requested data item(s) in database 140, as described in further detail below. Data access point 130 may further receive query requests for accessing data items stored in database 140. Upon receipt of such requests, data access point 130 may access and retrieve the requested data item(s) from database 140 and return them to the requesting one of clients 110. Data access point 130 may also receive category deletion requests from clients 110-1 through 110-N. Upon receipt of a category deletion request, data access point 130 may delete data items from database 140 that correspond to the category that has been requested to be deleted.

Database 140 may include any type of existing database that may store data for retrieval by data access point 130. Data access point 130 may, for example, interact with database 140 to store data items received from clients 110-1 through 110-N, may retrieve previously stored data items from database 140, and may delete data items associated with one or more categories.

The number of devices depicted in FIG. 1A is exemplary. Fewer, or more, devices than those shown may be included in network 100. Operations described herein as being performed by one device in network 100 may be performed by one or more other devices.

FIG. 1B graphically depicts exemplary interactions between a client (e.g., client 110-1) and data access point 130. As shown, client 110-1 may publish 150 a data item(s) to data access point 130. Publishing of a data item(s) to data access point 130 enables data access point 130 to store the data item(s) in database 140 for modification and/or retrieval by any of clients 110-1 through 110-N. Client 110-1 may further send a data query 160 to data access point 130 for retrieving a specific data item(s) from database 140. Client 110-1 may also send a category deletion request 170 to data access point 130 for deleting an entire category of data items stored in database 140. In an embodiment in which database 140 is serving as an IF-MAP repository, a given category may include an identifier of the publisher that published the data item(s) to the repository (e.g., a unique identifier of a respective one of clients 110). In such an IF-MAP embodiment, the category deletion request may correspond to an IF-MAP purgePublisher request.

Interactions, other than those shown in FIG. 1B, may occur between clients 110 and data access point 130.

Exemplary Network Device

Figure 2:
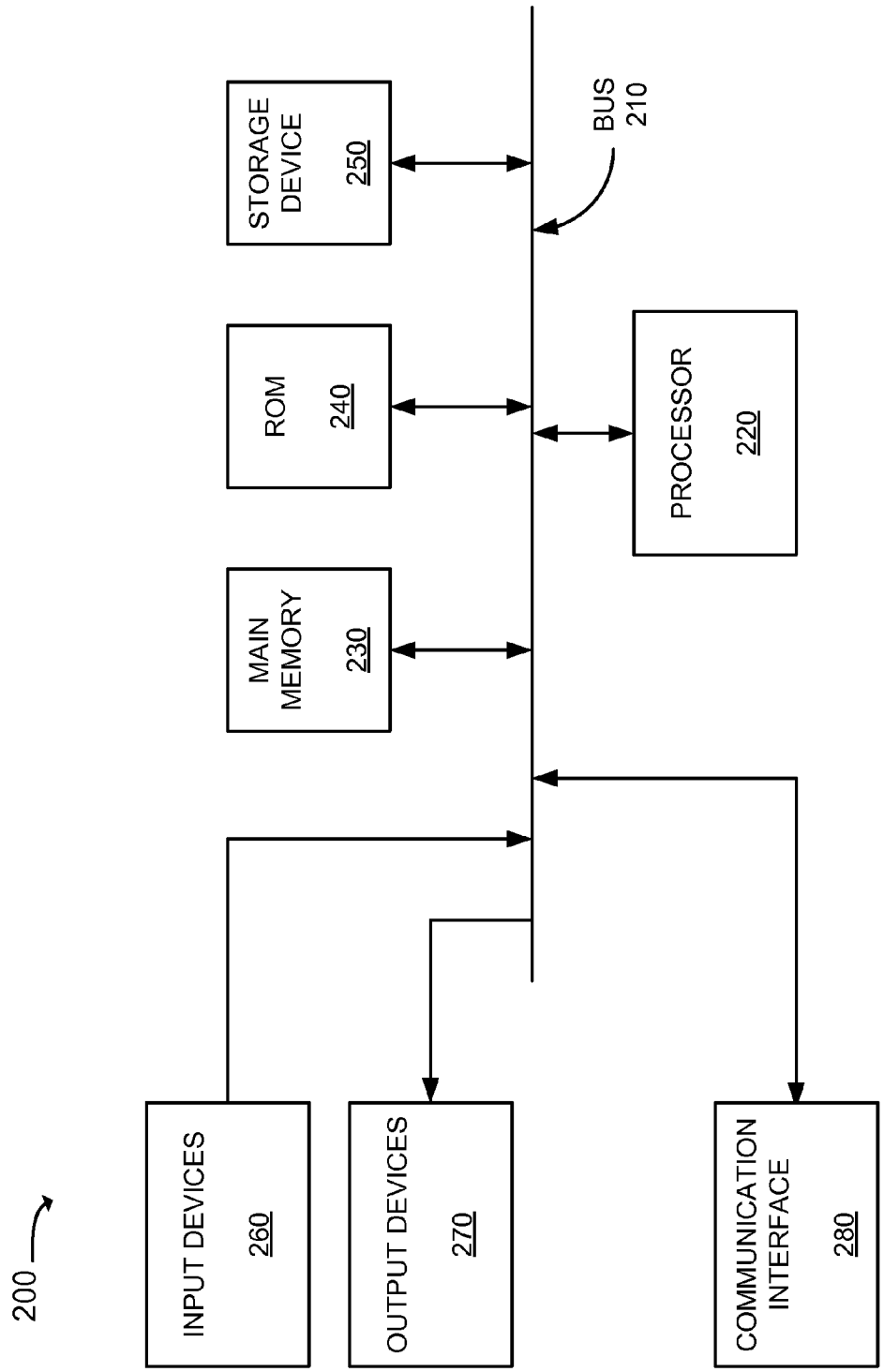
FIG. 2 is a diagram of components of an exemplary device that may correspond to the clients and/or data access point of FIG. 1B.

FIG. 2 is a diagram of components of a device 200 according to an exemplary embodiment. Device may correspond to each of clients 110-1 through 110-N, and data access point 130. Device 200 may include a bus 210, a processor 220, a main memory 230, a read only memory (ROM) 240, a storage device 250, input device(s) 260, output device(s) 270, and a communication interface 280. Bus 210 may include a path that permits communication among the components of device 200.

Processor 220 may include, for example, a processor, microprocessor, and/or processing logic that may interpret and execute instructions. In some implementations, processor 220 may include multiple processors (e.g., parallel processors). Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive. Storage device 250 may further include a solid state drive.

Input device(s) 260 may include one or more mechanisms that permit an operator to input information to device 200, such as a keyboard, a mouse, a pen, voice recognition and/or biometric mechanisms, etc. Output device(s) 270 may include one or more mechanisms that output information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via network 120.

Device 200 may perform certain operations or processes, as will be described in detail below. Device 200 may perform these operations in response to processor 220 executing software instructions contained in a computer-readable medium, such as memory 230. A computer-readable medium may be defined as a physical or logical memory device. A logical memory device may include memory space within a single physical memory device or spread across multiple physical memory devices.

The software instructions may be read into memory 230 from another computer-readable medium, such as storage device 250, or from another device via communication interface 280. The software instructions contained in memory 230 may cause processor 220 to perform operations or processes that will be described later. Alternatively, hardwired circuitry may be used in place of or in combination with software instructions to implement processes consistent with the principles of the invention. Thus, exemplary implementations are not limited to any specific combination of hardware circuitry and software.

Exemplary Data Item Table

Figure 3:
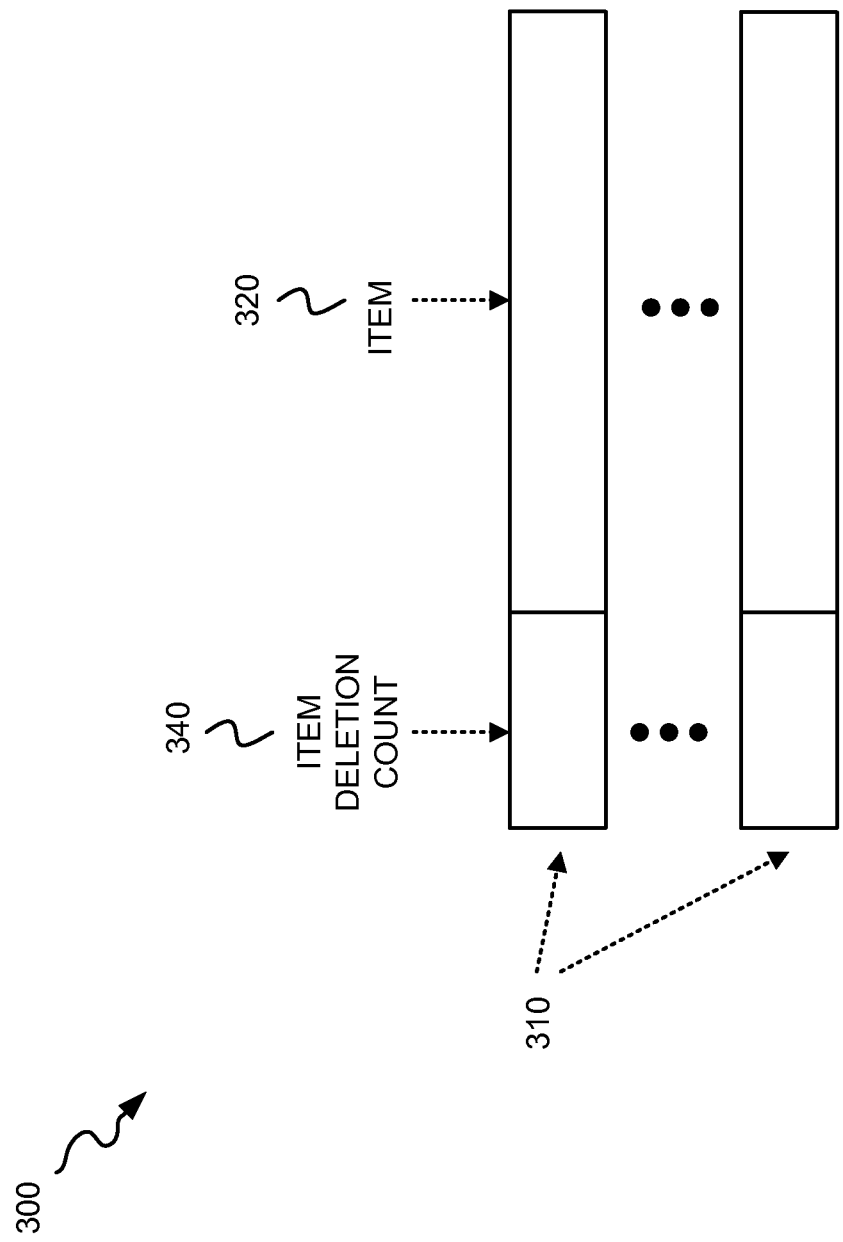
FIG. 3 is a diagram of a first exemplary table that may be stored in the database of FIG. 1A.

FIG. 3 illustrates a data item table 300 according to an exemplary embodiment. Data item table 300 may be stored in database 140. Data item table 300 may include multiple entries 310, each of which may include a data item field 320, and an item deletion count field 340. Entries 310 may include additional, and/or different, fields than those depicted in FIG. 3.

Data item field 320 may store a specific item of data received from a client 110. The item of data may include any type of data. For example, the item of data may include any type of data published using the IF-MAP protocol, such as information about other equipment and users in the network published by a client 110. In one implementation, client 110 may include a login server that decides whether to permit another computer to log-in to a network, and subsequently publishes information about the log-in computer (or the user of the log-in computer). A category may be associated with each corresponding data item stored in item field 320. The category may, for example, identify a set of related data items. In an IF-MAP protocol embodiment, for example, the category may include an identifier of the publisher, which published the data item stored in item field 320, to database 140. One or more items of data stored in item fields 320 of table 300 may, therefore, be associated with a category. Item deletion count field 340 may include a count of how many times a category had been deleted at a point in time in which the data item stored in item field 320 was received for storage in table 300. In some embodiments (not shown), there may be several versions of a same data item, with each version being labeled with a different value in item deletion count field 340.

Exemplary Category Table

Figure 4:
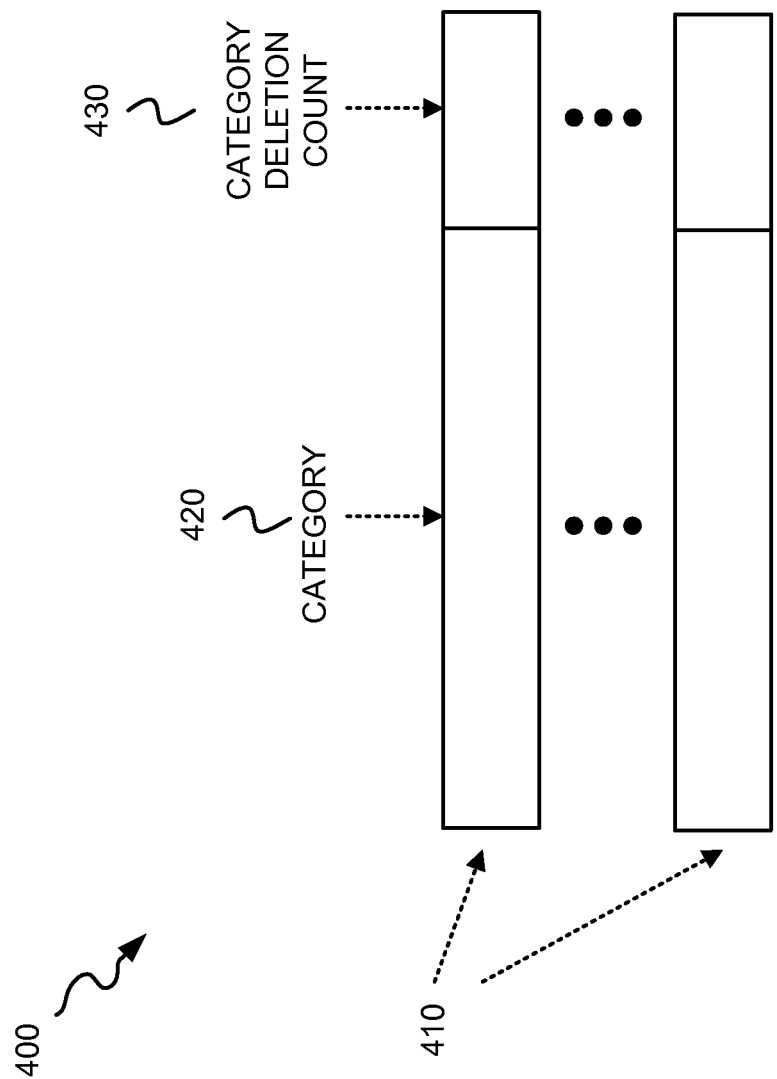
FIG. 4 is a diagram of a second exemplary table that may be stored in the database of FIG. 1A.

FIG. 4 illustrates a category table 400 according to an exemplary embodiment. Category table 400 may be stored in database 140. Category table 400 may include multiple entries 410, each of which may include a category field 420 and a category deletion count field 430. Entries 410 may include additional, and/or different, fields than those depicted in FIG. 3.

Category field 420 may store an identifier that identifies a category of data stored in database 140. Each category may identify a set of related data items that are stored in a respective item field 320 of table 300. Category deletion count field 430 may store a value representing the quantity of times the category, identified in category field 420 of a corresponding entry 410, has been deleted. Each time a deletion request is received for a category identified in category field 420, a counter value, stored in category deletion count field 430, may be incremented.

Exemplary Process for Categorizing and Storing an Item of Data

Figure 5:
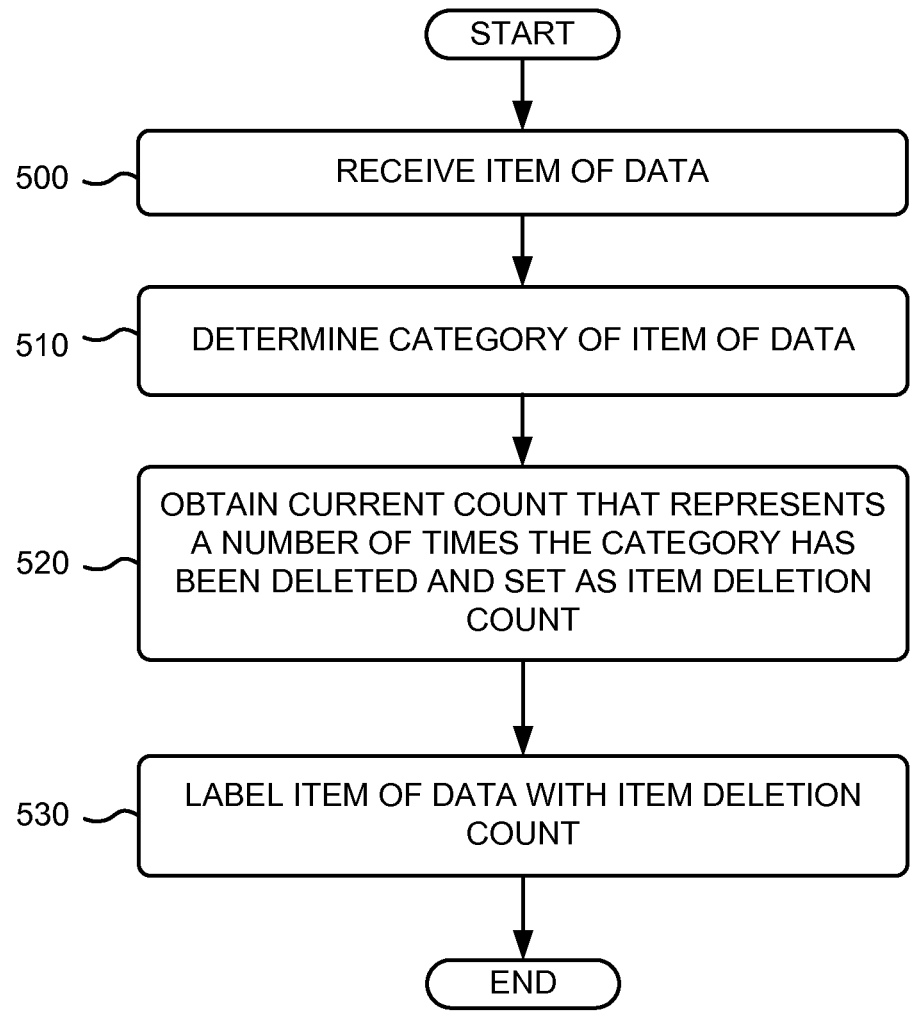
FIG. 5 is a flow chart that illustrates an exemplary process for categorizing and storing an item of data in the database of FIG. 1A.

FIG. 5 is a flow chart that illustrates an exemplary process for categorizing and storing an item of data received by data access point 130 from a client 110. The exemplary process of FIG. 5 may be implemented by data access point 130. In other embodiments, some or all of the blocks described below may be performed by another device or a combination of devices.

The exemplary process may include receiving an item of data (block 500). For example, as shown in FIG. 1B, data access point 130 may receive a publish request 150 that includes an item of data to be published (i.e., stored and made available to clients 110-1 through 110-N) in database 140. One of clients 110 may send publish request 150 to data access point 130 via network 120.

A category of the received item of data may be determined (block 510). The category of the received data item may be determined by extracting data from the data item, or from data related to the data item, or by computing a function of the data item. The function may include any type of function that may operate upon the data item to compute a category. In some embodiments, the category of the received item of data may be extracted from the publish request 150 received from a client 110. In an IF-MAP embodiment, for example, publish request 150 may include a publisher identifier (ID) that identifies client 110 that sent the item of data for storage, and this publisher ID may be extracted from publish request 150 and used as the category of the received item of data.

A current count that represents a number of times that the category has been deleted may be obtained and set as an item deletion count for the item of data (block 520). The category determined in block 510 may be matched with a category stored in category field 420 of table 400. A category deletion count from field 430 of the entry 410, in which the matching category field 420 is identified, may be retrieved from table 400. The retrieved category deletion count may then be set as the item deletion count for the item of data.

The item of data may be labeled with the obtained item deletion count (block 530). In one embodiment, the labeling may include storing the obtained deletion count in the corresponding item deletion count 340 of table 300.

Exemplary Category Deletion and Garbage Collection Process

Figure 6:
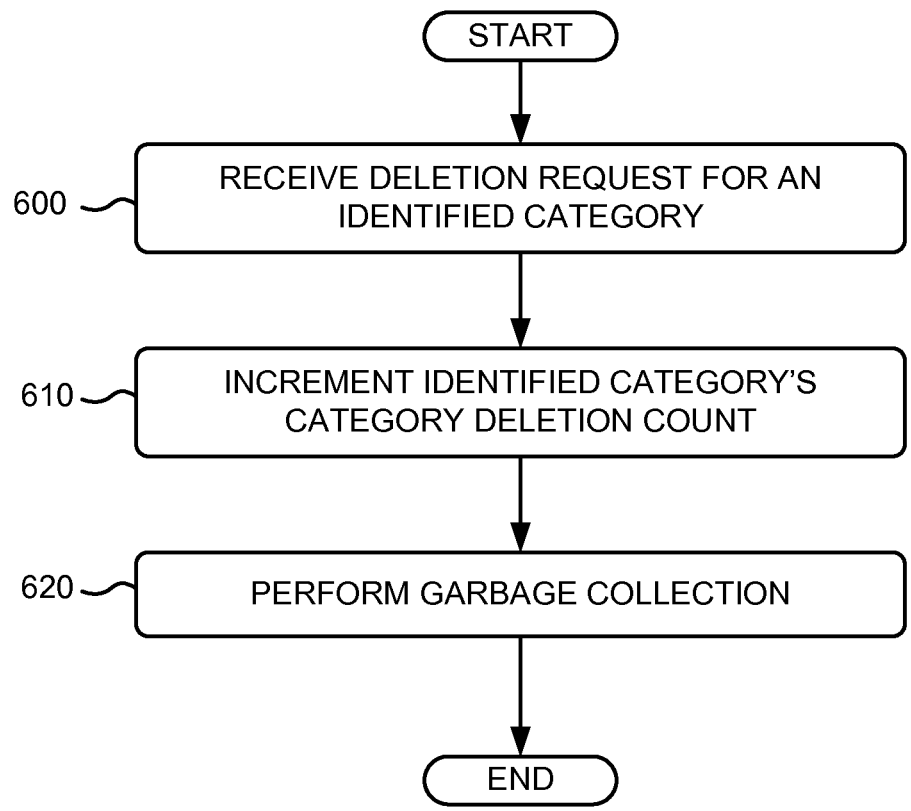
FIG. 6 is a flow chart that illustrates an exemplary process for receiving a category deletion request and for performing garbage collection with respect to data stored in the database of FIG. 1A.
Figure 7:
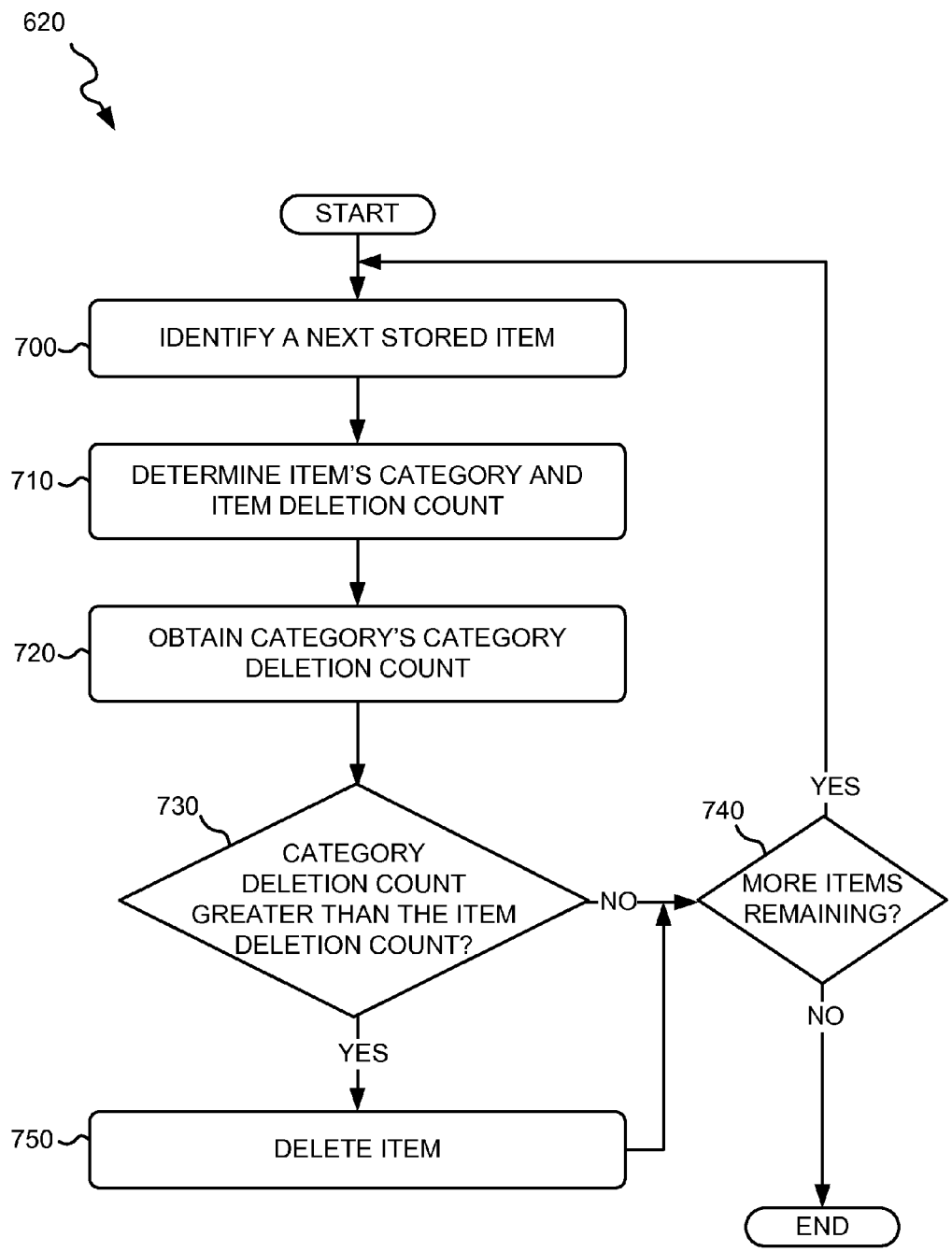
FIG. 7 is a flow chart that illustrates an exemplary garbage collection process for deleting data stored in the database of FIG. 1A.

FIGS. 6 and 7 are flow charts that illustrate an exemplary process for deleting a category and for performing garbage collection. The exemplary process of FIGS. 6 and 7 may be implemented by data access point 130. In other embodiments, some or all of the blocks described below may be performed by another device or a combination of devices.

The exemplary process may include receiving a deletion request for an identified category (block 600). A client 110 may send a deletion request, which identifies a particular category, to data access point 130 via network 120. Referring to FIG. 1B, for example, client 110-1 may send category deletion request 170 to data access point 130. Category deletion request 170 may include an identifier of a category. In one embodiment, the category identifier may include a unique identifier associated with client 110 that published the data items that are already associated with the category in database 140. Additionally, the deletion request may occur when it is determined that data access point 130 has lost contact with one of clients 110-1 through 110-N. Upon a loss of contact with one of clients 110-1 through 110-N, a deletion request may be considered to have been received by data access point 130 for a corresponding category.

The identified category's deletion count may be incremented (block 610). Table 400 may be searched to identify an entry, where the identifier in category field 420 matches the category identifier contained in the deletion request. The corresponding category deletion count field 430 for the entry may be retrieved, incremented, and then re-stored in the same category deletion count field 430.

Garbage collection may be performed (block 620). The garbage collection process may traverse through stored data items in table 300 to compare each data item's item deletion count with the count value stored in the identified category's category deletion count 430. If the comparison indicates that the count value stored in the identified category's category deletion count field 430 is greater than the data item's count value stored in the item deletion count field 340, then the data item may be deleted from table 300. Further exemplary details of the garbage collection process are described below with respect to FIG. 7.

The garbage collection process may begin with the identification of a next stored data item (block 700). During the first occurrence of block 700 in the garbage collection process, the next stored data item may be a first data item stored in database 140. Various techniques may be used for identifying a data item in table 300. In one embodiment, table 300 may be sequentially searched to process each stored data item corresponding to an entry 310. In another embodiment, table 300 may be indexed by category, so that members of a category that have had their deletion counts incremented can be found relatively quickly.

The data item's category and item deletion count may be determined (block 710). The contents of item deletion count field 340 of the data item identified in block 700 may be retrieved from table 300. The category of the data item identified in block 700 may be determined by extracting data from the data item, or from data related to the data item, or by computing a function of the data item. The function may include any type of function that may operate upon the data item to compute a category (i.e., the same function used in block 510 above). In some embodiments, the category of the received item of data may be extracted from the original publish request 150 received from a client 110. In an IF-MAP embodiment, for example, publish request 150 may include a publisher identifier (ID) that identifies client 110 that sent the item of data for storage, and this publisher ID may be extracted from publish request 150 and used as the category of the received item of data. The category's category deletion count may be obtained (block 720). The determined category from block 710 may be used to identify a matching category in an entry 410 in category field 420 of table 400. The contents of the corresponding category deletion count field 430 may then be retrieved.

A determination may be made whether the obtained category deletion count is greater than the item deletion count (block 730). A comparison may be made between the counter value stored in item deletion count field 340 retrieved in block 710 and the counter value stored in category deletion count field 430 retrieved in block 720. If the category deletion count is greater than the item deletion count (block 730—YES), then the item of data may be deleted (block 750). For example, if the counter value stored in the category deletion count field 430 retrieved in block 720 is greater than the counter value stored in the item deletion count field 340 retrieved in block 710, then the corresponding data item stored in item field 320 may be deleted, along with fields 330 and 340. The exemplary process may then continue at block 740.

It may be determined whether there are more data items remaining (block 740). If there are no more data items remaining (block 740—NO), then the exemplary process may end. If there are more data items remaining (block 740—YES), then the exemplary process may continue at block 700 with the identification of a next stored data item.

The exemplary process of blocks 700 through 750 may be repeated for each data item stored in table 300. Subsequent to completion of blocks 700-750 for each data item in table 300, the garbage collection process of block 620 may complete to finish the exemplary deletion request process of FIG. 6.

Exemplary Item Query Process

Figure 8:
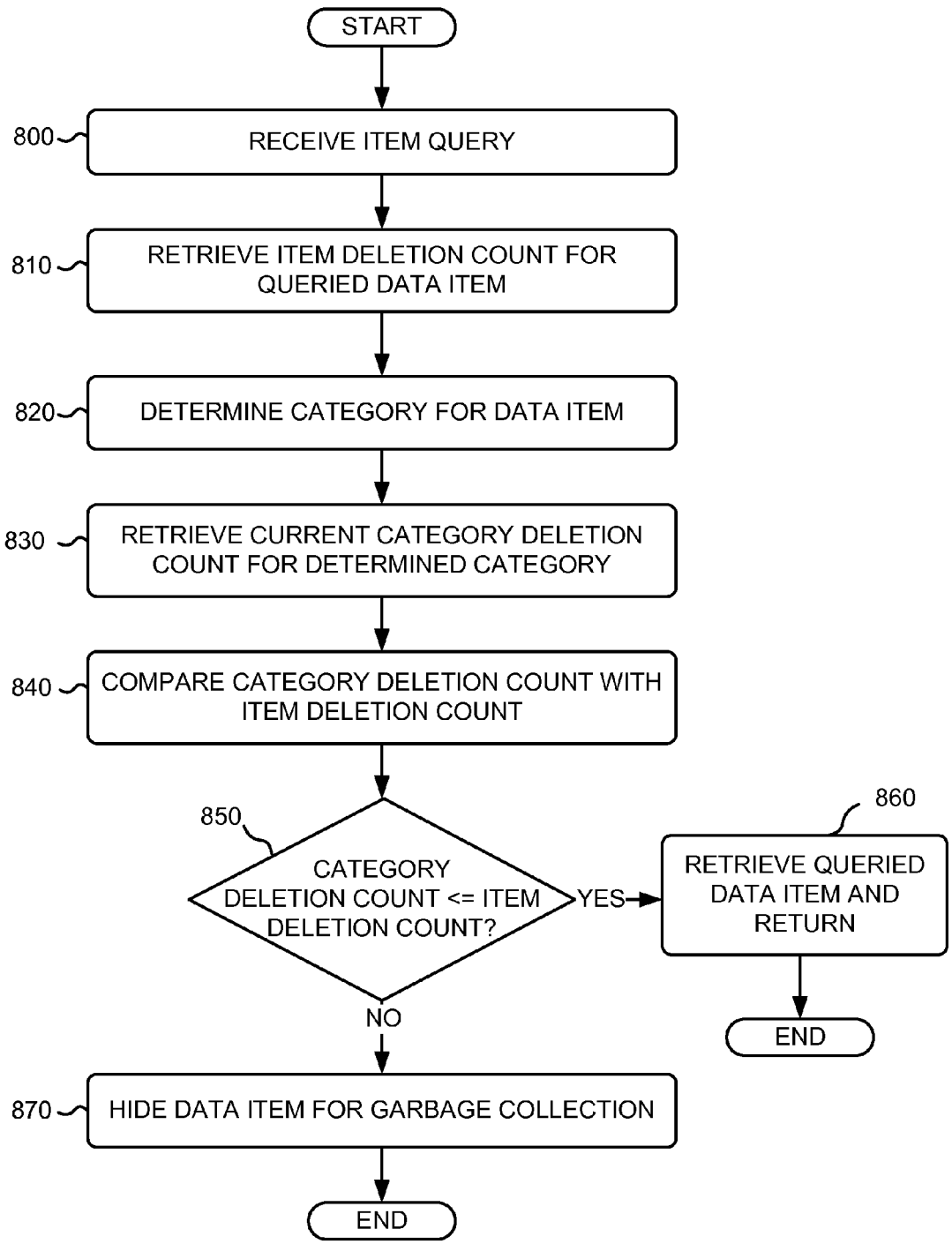
FIG. 8 is a flow chart that illustrates an exemplary process for responding to an item query received at the data access point of FIG. 1A.

FIG. 8 is a flow chart that illustrates an exemplary process for receiving an item query from client 110. The exemplary process of FIG. 8 may be implemented by data access point 130. In other embodiments, some or all of the blocks described below may be performed by another device or a combination of devices.

The exemplary process may include the receipt of an item query (block 800). A client 110 may send an item query to data access point 130 to seek to retrieve a specific data item(s) from database 140. An item deletion count for the queried item may be retrieved (block 810). The data item identified in the item query may be compared to the content of item fields 320 in table 300 to identify an entry 310 of table 300 whose content matches this item. The contents of the corresponding item deletion count 340, of the identified entry 310, may then be retrieved. A category for the data item may be determined (block 820). The category of the data item may be determined by extracting data from the data item, or from data related to the data item, or by computing a function of the data item. The function may include any type of function that may operate upon the data item to compute a category.

A current category deletion count for the determined category may be retrieved (block 830). Table 400 may be searched to locate an entry 410 whose category field 420 content matches the contents of category field 330 retrieved in block 820. The counter value stored in category deletion count field 430 for the identified entry 410 may be retrieved.

The category deletion count and the item deletion count may be compared (block 840). For example, the counter value stored in category deletion field 430, retrieved in block 830, may be compared with the counter value stored in item deletion count field 340, retrieved in block 810.

If the comparison of block 840 indicates that the category deletion count is less than or equal to the item deletion count (block 850—YES), then the queried data item may be retrieved and returned (block 860). The contents of item field 320 for entry 310, identified in block 810, may be retrieved and returned to the requesting client 110. If the comparison of block 840 indicates that the category deletion count is greater than the item deletion count (block 850—NO), then the queried data item may be hidden (block 870). A queried data item may be "hidden" by making the data item non-retrievable from table 300 in response to an item query, even though the queried item may still be stored in table 300. However, the queried data item may otherwise be retrievable for other processing until deleted in block 750 of FIG. 7 of the garbage collection process.

CONCLUSION

As described herein, categories of data may be deleted in an atomic fashion from a database. The atomic category deletion process, as described herein, uses a counter value, which represents a number of times that a given category has been deleted, when deciding whether to delete items of data that are associated with a category that is being processed for deletion. The exemplary embodiments described herein may be applied, for example, to purgePublisher requests in the IF-MAP protocol, where the categories of data that are deleted correspond to sets of data items that are labeled with a same publisher identifier.

The foregoing description of embodiments described herein provides illustration and description, but is not intended to be exhaustive or to limit the embodiments described herein to the precise form disclosed. Modifications and variations are possible in light of the above teachings or may be acquired from practice of the invention. For example, certain portions have been described as executed as instructions by one or more processing units. However, implementations, other than software implementations, may be used, including, for example, hardware implementations, such as application specific integrated circuits, field programmable gate arrays, or combinations of hardware and software.

While series of blocks have been described in FIGS. 5-8, the order of the blocks may vary in other implementations. Also, non-dependent blocks may be performed in parallel. Even though particular combinations of features are recited in the claims and/or disclosed in the specification, these combinations are not intended to limit the invention. In fact, many of these features may be combined in ways not specifically recited in the claims and/or disclosed in the specification. For example, the isolation rule (i.e., rule that other operations cannot access the data in an intermediate state during a transaction) may be implemented in some embodiments. To achieve isolation, every transaction may begin by taking a "point-in-time" snapshot of the item deletion counts (i.e., from item deletion count field 340), and when a data item is queried from database 140, the snapshot of the item deletion counts may be used rather than the most current item deletion counts. In this way, a category deletion that happens after the "point-in-time" snapshot, but before the transaction finishes, will not affect the transaction. The transaction may include, for example, an update/publish or a query.

Exemplary embodiments have been described herein with respect to storing a single category and a single item deletion count in association with each data item in table 300 of database 140. However, in other embodiments, each item can belong to n categories, where the n categories form a hierarchy. In such embodiments, when storing a data item in table 300, the category is stored in association with the data item that is the farthest from the root of the hierarchy. Then, to delete a category, the category's category deletion count is incremented, and the category deletion counts of all the category's descendants in the hierarchy are also incremented.

Exemplary embodiments have further been described herein as using deletion counts (e.g., item deletion count 340, category deletion count 430) for performing garbage collection. In other embodiments, other "monotonic" values (i.e., values that are always increasing) may be used. For example, in one embodiment, monotonic time stamps could be used instead of the deletion counts. In such an embodiment, an item could be garbage if its timestamp is greater than the category's timestamp.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed:

1. A method comprising:
   receiving, by a device, a query for a data item;
   retrieving, by the device, an item deletion count associated with the data item;
   determining, by the device, a category associated with the data item;
   retrieving, by the device, a category deletion count associated with the determined category;
   comparing, by the device, the retrieved item deletion count and the retrieved category deletion count;
   determining, by the device, whether the retrieved item deletion count is greater than or less than the retrieved category deletion count;

retrieving, by the device and when the retrieved item deletion count is greater than the retrieved category deletion count, the data item for collection; and hiding, by the device and when the retrieved item deletion count is less than the retrieved category deletion count, the data item from collection.

2. The method of claim 1, where, when determining the category associated with the data item, the method further comprises:
determining the category associated with the data item by extracting data related to the data item, or
determining the category associated with the data item by calculating a function of the data item.

3. The method of claim 1, where, when determining the category associated with the data item, the method further comprises:
determining the category based on a publish request received from another device, the publish request including:
a publisher identifier that identifies the other device.

4. The method of claim 3, further comprising:
using the publisher identifier as the category.

5. The method of claim 1, further comprising:
determining whether the retrieved item deletion count is equal to the retrieved category deletion count; and
retrieving, when the retrieved item deletion count is equal to the retrieved category deletion count, the data item.

6. The method of claim 1, where, when hiding the data item, the method further comprises:
marking the data item as non-retrievable.

7. A device comprising:
a processor to:
receive a query for a data item;
retrieve an item deletion count associated with the data item;
determine a category associated with the data item;
retrieve a category deletion count associated with the determined category;
compare the retrieved item deletion count and the retrieved category deletion count;
determine whether the retrieved item deletion count is greater than or less than the retrieved category deletion count;
retrieve, when the retrieved item deletion count is greater than the retrieved category deletion count, the data item for collection; and
hide, when the retrieved item deletion count is less than the retrieved category deletion count, the data item from collection.

8. The device of claim 7, where, when determining the category associated with the data item, the processor is further to:
determine the category associated with the data item by extracting data related to the data item, or
determine the category associated with the data item by calculating a function of the data item.

9. The device of claim 7, where, when determining the category associated with the data item, the processor is further to:
determine the category based on a publish request received from another device, the publish request including:
a publisher identifier that identifies the other device.

10. The device of claim 9, where the processor is further to:
use the publisher identifier as the category.

11. The device of claim 7, where the processor is further to:
determine whether the retrieved item deletion count is equal to the retrieved category deletion count; and
retrieve, when the retrieved item deletion count is equal to the retrieved category deletion count, the data item for collection.

12. The device of claim 9, where, when hiding the data item, the processor is further to:
mark the data item as non-retrievable.

13. A non-transitory computer-readable medium storing instructions, the instructions comprising:
one or more instructions which, when executed by at least one processor, cause the at least one processor to:
receive a query for a data item;
retrieve an item deletion count associated with the data item;
determine a category associated with the data item;
retrieve a category deletion count associated with the determined category;
compare the retrieved item deletion count and the retrieved category deletion count;
determine whether the retrieved item deletion count is greater than or less than the retrieved category deletion count;
retrieve, when the retrieved item deletion count is greater than the retrieved category deletion count, the data item for collection; and
hide, when the retrieved item deletion count is less than the retrieved category deletion count, the data item from collection.

14. The non-transitory computer-readable medium of claim 13, where the one or more instructions to determine the category associated with the data item further include:
one or more instructions which, when executed by the at least one processor, cause the at least one processor to:
determine the category associated with the data item by extracting data related to the data item, or
determine the category associated with the data item by calculating a function of the data item.

15. The non-transitory computer-readable medium of claim 13, where the one or more instructions to determine the category associated with the data item further include:
one or more instructions which, when executed by the at least one processor, cause the at least one processor to:
extract the category based on a publish request received from another device, the publish request including:
a publisher identifier that identifies the other device.

16. The non-transitory computer-readable medium of claim 15, where the instructions further comprise:
one or more instructions which, when executed by the at least one processor, cause the at least one processor to:
use the publisher identifier as the category.

17. The non-transitory computer-readable medium of claim 13, where the instructions further comprise:
one or more instructions which, when executed by the at least one processor, cause the at least one processor to:
determine whether the retrieved item deletion count is equal to the retrieved category deletion count; and
retrieve, when the retrieved item deletion count is equal to the retrieved category deletion count, the data item for collection.

18. The non-transitory computer-readable medium of claim 13, where the one or more instructions to hide the data item further include:
one or more instructions which, when executed by the at least one processor, cause the at least one processor to:
mark the data item as non-retrievable.

19. The method of claim 1, further comprising:
providing the retrieved item to another device,
the other device transmitting the query.

20. The device of claim 7, where the processor is further to:
provide the retrieved item to another device,
   the other device transmitting the query.

\* \* \* \* \*